United States Patent [19]

Wolcott

[11] Patent Number: 4,859,378
[45] Date of Patent: Aug. 22, 1989

[54] METHOD OF ULTRASONICALLY ASSEMBLING WORKPIECES

[75] Inventor: Jeffrey S. Wolcott, Sandy Hook, Conn.

[73] Assignee: Branson Ultrasonics Corporation, Danbury, Conn.

[21] Appl. No.: 263,864

[22] Filed: Oct. 28, 1988

[51] Int. Cl.⁴ .............................................. B29C 65/08
[52] U.S. Cl. ..................... 264/23; 156/73.1; 156/221; 228/110; 228/136; 264/249; 264/294
[58] Field of Search ...................... 156/73.1, 221, 311, 156/580.1, 580.2; 228/1.1, 110, 136; 264/23, 249, 294

[56] References Cited

U.S. PATENT DOCUMENTS

| | | | |
|---|---|---|---|
| 3,367,809 | 2/1968 | Soloff | 156/73.1 |
| 3,483,611 | 12/1969 | Balamuth et al. | 156/73.1 |
| 3,485,982 | 12/1969 | Maire | 156/73.1 |
| 3,499,808 | 3/1970 | Obeda | 156/580.2 |
| 3,699,719 | 10/1972 | Rozdilsky et al. | 51/59 SS |
| 3,899,116 | 8/1975 | Mims | 228/110 |
| 4,326,903 | 4/1982 | Summo | 156/580.2 |

Primary Examiner—Michael Wityshyn
Attorney, Agent, or Firm—Polster, Polster and Lucchesi

[57] ABSTRACT

Assembling of two workpieces by the ultrasonic staking or riveting method comprises the providing of a first thermoplastic workpiece having an upstanding stud, an apertured second workpiece juxtaposed on the first workpiece so that the stud protrudes through the aperture of the first workpiece, and a horn applying ultrasonic energy to the upstanding, free end of the stud by forced contact between the stud end and the horn. The improvement comprises the application of ultrasonic energy to the horn during brief time periods which alternate with brief time periods during which the horn, while still in contact with the stud end, is substantially inactive.

5 Claims, 1 Drawing Sheet

METHOD OF ULTRASONICALLY ASSEMBLING WORKPIECES

BACKGROUND

This invention relates to assembling two workpieces by the use of ultrasonic vibrations and, more specifically, concerns the assembling of workpieces by the so-called ultrasonic staking or riveting process wherein ultrasonic energy supplied by a horn is used to deform a thermoplastic stud upstanding from a first workpiece to capture a second workpiece having an aperture through which such study extends. This process is described, for example, in "Ultrasonic Plastics Assembly" published by Branson Sonic Power Company, Danbury, CT 06810 (1979), pages 49–51.

Ultrasonic staking has been revealed in U.S. Pat. No. 3,367,809 dated Feb 6, 1968 issued to R. S. Soloff entitled "Sonics" and in U.S. Pat. No. 3,499,808 dated Mar 10, 1970 issued to E. G. Obeda entitled "Method and apparatus for Securing Parts Together by Sonic Energy".

The process has found wide acceptance in almost all instances where thermoplastic parts or a thermoplastic part and a non-thermoplastic part are to be assembled or fastened to one another. There are numerous applications of this type in the manufacture of electrical appliances, automobile dashboards and, more recently, in assembling watch movements and digital computer components.

In many instances, there exists the requirement to more accurately control, during the deformation of the stud, the flow of the softened thermoplastic material in order to provide a mechanically precise assembly and also an assembly characterized by a neat and pleasing appearance. The uncontrolled flow of thermoplastic material is particularly undesirable when crystalline and filled plastic materials are used. Typical fillers include, glass, talc, calcium carbonate, carbon, etc.. With the use of such fillers there is a tendency for the generation of particulate matter and loose particles which crumble and fall away from the assembly. With amorphous plastics there is a tendency for the softened thermoplastic material to flow too freely.

SUMMARY OF THE INVENTION

Improved deformation, that is, better control of the softened material, has been noted when the ultrasonic energy provided by a horn, which is in forced contact with the free end of the upstanding stud, is supplied in bursts or pulses of energy. In other words, the horn is rendered resonant, providing ultrasonic energy, for short periods of time which alternate with short periods of time during which the horn is rendered substantially inactive. The plastic material is caused to become soft and is deformed during the time period during which the ultrasonic energy is applied, but during the period during which the horn is inactive, the horn acts as a heat sink, causing the plastic material to cool and to solidify.

In this manner, the deformation of the stud is achieved incrementally or in discrete steps, providing a better and more precisely controlled assembly exhibiting a more pleasing and neat appearance.

One of the principal objects of this invention is the provision of an improved ultrasonic staking or riveting method for fastening two workpieces to one another.

Still another and important object of this invention is the provision of an improved ultrasonic staking method wherein a horn provides ultrasonic energy to a thermoplastic stud during brief periods of time alternating with brief periods during which substantially no ultrasonic energy is provided by the horn.

Other and still further objects of this invention will become more clearly apparent from the following description when taken in conjunction with the accompanying drawings

DETAILED DESCRIPTION OF THE INVENTION

Figure 1:
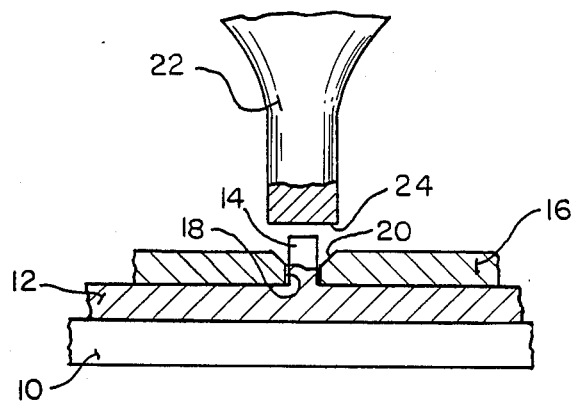
FIG. 1 is an elevational view, partly in section, illustrating the ultrasonic staking process for two workpieces to be fastened to one another.

Referring now to the figures and FIG. 1 in particular, numeral 10 designates a base supporting a first thermoplastic workpiece 12 which is provided with an upstanding stud 14, preferably of circular cross-section. A second workpiece 16, which may be of thermoplastic or non-thermoplastic material, is superposed on the workpiece 12 and has a circular aperture 18 through which the stud 14 extends. The workpiece 16 is provided also with a chamfer 20 for forming a recess adapted to receive and be filled with molten and displaced material from the stud 14 during the deformation of the stud.

A horn 22, also known as resonator, mechanical amplifier, etc., dimensioned to be rendered mechanically resonant along its longitudinal axis for providing vibrations of predetermined ultrasonic frequency, typically a frequency in the range from 16 kHz to 60 kHz, is in contact with the upstanding end of the stud 14 to cause the flat output surface 24 of the horn 22 to be in energy transmitting relation with the free, upstanding end of the stud 14.

Figure 2:
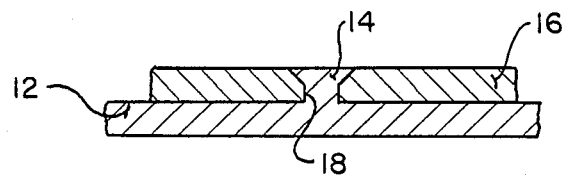
FIG. 2 is a view of the two workpieces fastened to one another after completion of the staking process.

Upon rendering the horn 22 resonant and while the horn is in forced contact with the stud, responsive to the dissipation of ultrasonic energy, the thermoplastic material of the stud 14 softens and is urged to flow into the recess provided by the chamfer 20. Upon the cessation of ultrasonic energy transmission from the horn and while the output surface 24 of the horn is still in contact with the stud, the softened and displaced thermoplastic material solidifies to provide the finished assembly shown in FIG. 2.

Figure 3:
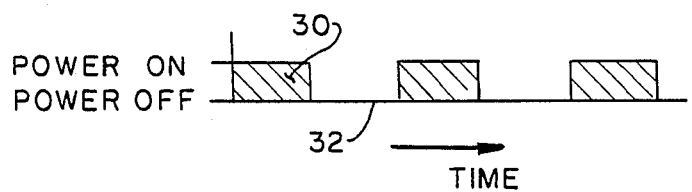
FIG. 3 is a timing diagram showing the application of ultrasonic energy during spaced time periods.

It has been discovered that a more controlled flow of thermoplastic material is obtained when the deformation of the stud 14 is carried out incrementally as shown in FIG. 3. Time periods 30 during which the horn is rendered resonant, i.e. active, alternate with periods 32 during which the horn 22, while in contact with the stud 14, is rendered inactive. It is believed that during the inactive time periods 32 the horn 22 acts as a heat sink, cooling the softened stud material, thereby effecting a controlled flow of the plastic material and, thus, effecting incremental deformation of the thermoplastic stud.

The durations of periods 30 and 32 may be varied by experimentation to suit the application. With different thermoplastic materials, with or without fillers, and with different types of assemblies, the duration of each may be from a few milliseconds to a few hundred milliseconds. In the illustrative embodiment, each period lasts from twenty-five to one hundred milliseconds, and the entire forming operation requires on the order of two seconds. While the illustration in FIG. 3 shows, as a typical example, spaced energy bursts with a fifty per cent duty cycle, other duty cycles will prove equally as effective.

Timing means for effecting ON/OFF cycling is shown in U.S. Pat. No. 3,699,719 dated Oct. 24, 1972 issued to N. Rozdilski et al, entitled "Ultrasonic Machining" Modern ultrasonic assembly equipment incorporates microprocessors and the cycling can be programmed quite readily by a suitable software program.

While there has been described and illustrated a preferred embodiment of the invention and modifications thereof have been indicated, it will be apparent to those skilled in the art that various further changes and modifications may be made without departing from the broad principle of this invention which shall be limited only by the scope of the appended claims.

What is claimed is:

1. The method of softening and deforming a portion of a thermoplastic workpiece by ultrasonic vibrations comprising the steps of providing forced engagement between said portion and a horn adapted to be resonant at a predetermined frequency in the ultrasonic frequency range; rendering said horn resonant during first time periods which alternate with second time periods during which said horn is rendered substantially inactive, whereby to cause said portion to be deformed incrementally as a result of the dissipation of ultrasonic energy by said portion during said first periods and cooling of said portion during said second periods.

2. The method of providing an ultrasonically staked assembly of two workpieces comprising the steps of providing a first thermoplastic workpiece having an upstanding stud; providing an apertured second workpiece; disposing said second workpiece upon said first workpiece so that said stud extends through said aperture of said second workpiece and above the exposed surface of said second workpiece. deforming the upstanding end of said stud by bringing a horn adapted to be mechanically resonant at an ultrasonic frequency into forced contact with said upstanding end, whereby responsive to the application of ultrasonic vibrations to said stud and the dissipation of ultrasonic energy the thermoplastic material of said upstanding stud end is caused to soften and become displaced, the improvement comprising: rendering said horn while in contact with said stud resonant during first time periods which alternate with second time periods during which said horn is rendered substantially inactive.

3. The method as set forth in claim 2, wherein said second workpiece is chamfered at said aperture for creating a recess for receiving therein softened and displaced material from said stud.

4. The method as set forth in claim 2, said horn having a flat output surface in forced contact with the upstanding end of said stud.

5. The method as set forth in claim 2, said horn being rendered resonant at a predetermined frequency in the range between 16 kHz and 60 kHz.

* * * * *